US012654143B2

(12) United States Patent
Ho

(10) Patent No.: US 12,654,143 B2
(45) Date of Patent: Jun. 16, 2026

(54) DYNAMIC MIXER HEAD WITH SEALING PORTION

(71) Applicant: Phillip Phung-I Ho, Santa Barbara, CA (US)

(72) Inventor: Phillip Phung-I Ho, Santa Barbara, CA (US)

( * ) Notice: Subject to any disclaimer, the term of this patent is extended or adjusted under 35 U.S.C. 154(b) by 445 days.

(21) Appl. No.: 18/232,383

(22) Filed: Aug. 10, 2023

(65) Prior Publication Data

US 2025/0050288 A1 Feb. 13, 2025

(51) Int. Cl.

*B01F 27/072* (2022.01)
*B01F 27/07* (2022.01)
*B01F 27/09* (2022.01)
*B01F 27/191* (2022.01)
*B01F 101/19* (2022.01)

(52) U.S. Cl.

CPC ........ *B01F 27/0724* (2022.01); *B01F 27/074* (2022.01); *B01F 27/092* (2022.01); *B01F 27/191* (2022.01); *B01F 2101/19* (2022.01)

(58) Field of Classification Search

CPC .. B01F 27/0724; B01F 27/074; B01F 27/092; B01F 27/191; B01F 2101/19; B01F 2101/2305; B01F 27/50; B01F 33/86; B01F 33/862; B01F 25/105; B01F 27/92; B01F 35/71; B01F 23/43; B01F 23/47; B01F 27/84; B01F 27/922; B01F 35/712; B01F 27/85; B01F 7/24; B01F 15/02; B01F 15/0203; B01F 7/241; B01F 7/00216; B01F 3/10; B01F 7/166; B01F 3/0853; B01F 7/1665; B29B 7/7636; B29B 7/7647; B29B 7/7652; B29B 7/401; B29B 7/407; B29B 7/42; B29B 7/48; B29B 7/7605; B29B 7/76; B29C 39/22; A61C 5/06; A61C 5/068

USPC ........................................... 366/172.1, 325.2

See application file for complete search history.

(56) References Cited

U.S. PATENT DOCUMENTS 6,443,612 B1 * 9/2002 Keller .................. B01F 27/112 222/145.6
6,932,243 B2 * 8/2005 Keller .................. B01F 35/522 222/145.6
8,313,232 B2 * 11/2012 Keller ................. B01F 27/0724 366/162.3

(Continued)

FOREIGN PATENT DOCUMENTS

JP H06226178 A * 8/1994 ....... B05C 17/00566

*Primary Examiner* — Charles Cooley
(74) *Attorney, Agent, or Firm* — WPAT, PC

(57) ABSTRACT

A dynamic mixer head has a cover, a housing, and a rotor. The cover has a first base board, two inlets, and a holding cylinder. A rotor holding channel is formed in the holding cylinder and a sealing portion protrudes from an inner wall surface of the rotor holding channel. The housing is mounted on the cover and has a second base board, a mixing cylinder, and an inner channel. The inner channel is formed in the mixing cylinder and fluidly communicates with an outlet. The rotor is rotatably disposed in the inner channel and has a rotor axle and a mixing rod. The rotor axle is disposed through the rotor holding channel, contacts and is surrounded by the sealing portion. The mixing rod has multiple first vanes. The dynamic mixer head does not need two sealing structures and tight fitting of the rotor and the holding cylinder.

18 Claims, 7 Drawing Sheets

(56) References Cited

U.S. PATENT DOCUMENTS

| | | | | |
|---|---|---|---|---|
| 8,876,364 | B2 * | 11/2014 | Gartmann | B01F 33/50112 366/331 |
| 9,827,539 | B2 * | 11/2017 | Ho | B01F 27/092 |
| 2002/0175186 | A1 * | 11/2002 | Keller | B01F 35/522 222/145.6 |
| 2009/0296516 | A1 * | 12/2009 | Keller | B01F 27/0724 366/181.4 |
| 2025/0050288 | A1 * | 2/2025 | Ho | B01F 27/0724 |

* cited by examiner

DYNAMIC MIXER HEAD WITH SEALING PORTION

BACKGROUND OF THE INVENTION

1. Field of the Invention

The present invention relates to a dynamic mixer head with a sealing portion, especially to a dynamic mixer head with a sealing portion that is configured to mix viscous compositions of dental components.

2. Description of the Prior Arts

A conventional dynamic mixer head disclosed in U.S. Pat. No. 8,876,364 B2, which is configured to mix multiple components, has a housing and a rotor element, and a seal for sealing the rotor element. The seal is composed with a first sealing element and a second sealing element, and the first sealing element is arranged upstream of the second sealing element; the first sealing element is a sealing lip formed on the housing while the second sealing element is a cylindrical support surface on the rotor element.

Because the first sealing element and the second sealing element together provide functions not only as a seal to prevent leakage of the components, but also as a bearing and a shaft supporting the rotor element, the first sealing element and the second sealing element have to be arranged in an axial orientation along the rotor element which is tiny in size. Therefore, the first sealing element is very difficult to manufacture due to the location and the restricted size.

Furthermore, the second sealing element is designed as a cylindrical surface and tightly fit with the housing, such that the second sealing element is capable of preventing leakage of the components while the rotor element is still rotatable; however, being tightly fit also causes severe drags on the rotor element, thus preventing free rotation which can lead to improper mixing of the materials. The improper mixing will be even worse when the components are viscous. Due to the aforementioned challenges, till this date, the design of the prior art has never been put into production.

To overcome the shortcomings, the present invention provides a dynamic mixer head with a sealing portion to mitigate or obviate the aforementioned problems.

SUMMARY OF THE INVENTION

The main objective of the present invention is to provide a dynamic mixer head with a sealing portion that has one sealing portion which provides leakage-resisting function without dragging a rotor, and further reducing a manufacturing complexity.

The dynamic mixer head has a cover, a housing, and a rotor. The cover has a first base board, two inlets, and a holding cylinder. The first base board has a first engaging portion formed on a border of the first base board. Two inlets are formed through the first base board and spaced apart from each other. The holding cylinder is formed on the first base board and has a rotor holding channel and a sealing portion. The rotor holding channel is formed in the holding cylinder and spatially communicating with two ends of the holding cylinder. The sealing portion protrudes from an inner wall surface of the rotor holding channel. The housing is mounted on the cover and has a second base board, a mixing cylinder, and an inner channel. The second base board is engaged with the first base board and has a second engaging portion and two grooves. The second engaging portion is formed on a border of the second base board and engaging with the first engaging portion. The two grooves are recessed from a surface of the second base board, said surface of the second base board faces to the first base board, and each one of the two grooves fluidly communicates with a respective one of the two inlets of the cover. The mixing cylinder is connected to another surface of the second base board, and said another surface is away from the first base board. The mixing cylinder has an outlet formed on an end surface away from the second base board. The inner channel is formed in the mixing cylinder and through the mixing cylinder and the second base board. The inner channel fluidly communicates with the outlet, the two grooves, and the rotor holding channel. The rotor is rotatably disposed in the inner channel and through the cover, and the rotor has a rotor axle and a mixing rod. The rotor axle is disposed through the rotor holding channel, and a peripheral surface of the rotor axle contacts and is surrounded by the sealing portion. The mixing rod is connected to the rotor axle and disposed in the inner channel, and the mixing rod has multiple first vanes protruding from a peripheral surface of the mixing rod.

Therefore, compared with the conventional dynamic mixer head in the prior art, the dynamic mixer head with the sealing portion in the present invention does not need two sealing structures. The sealing portion in the present invention is formed on the inner wall surface of the rotor holding channel, making it easier to manufacture, and the tolerance between the sealing portion and the rotor is little such that the rotor can rotate freely without affecting the sealing function.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
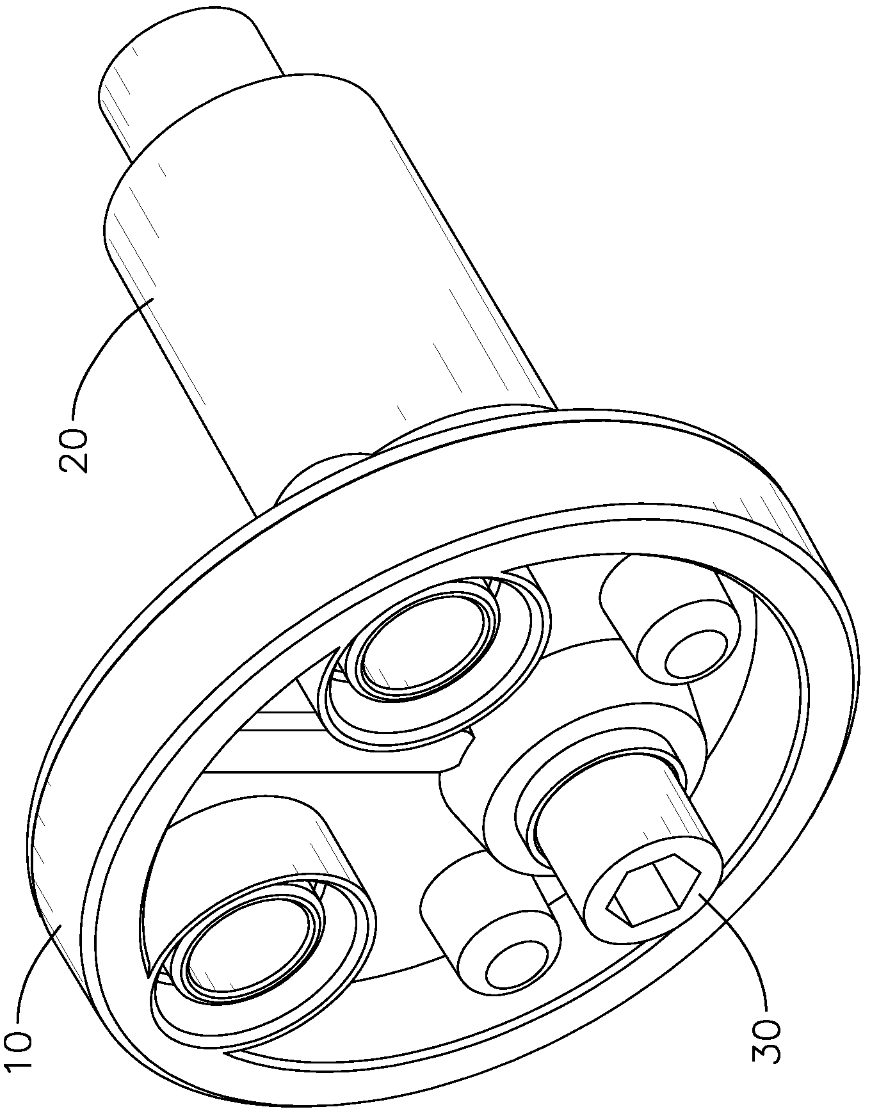
FIG. 1 is a perspective view of a dynamic mixer head with a sealing portion in accordance with the present invention.
Figure 2:
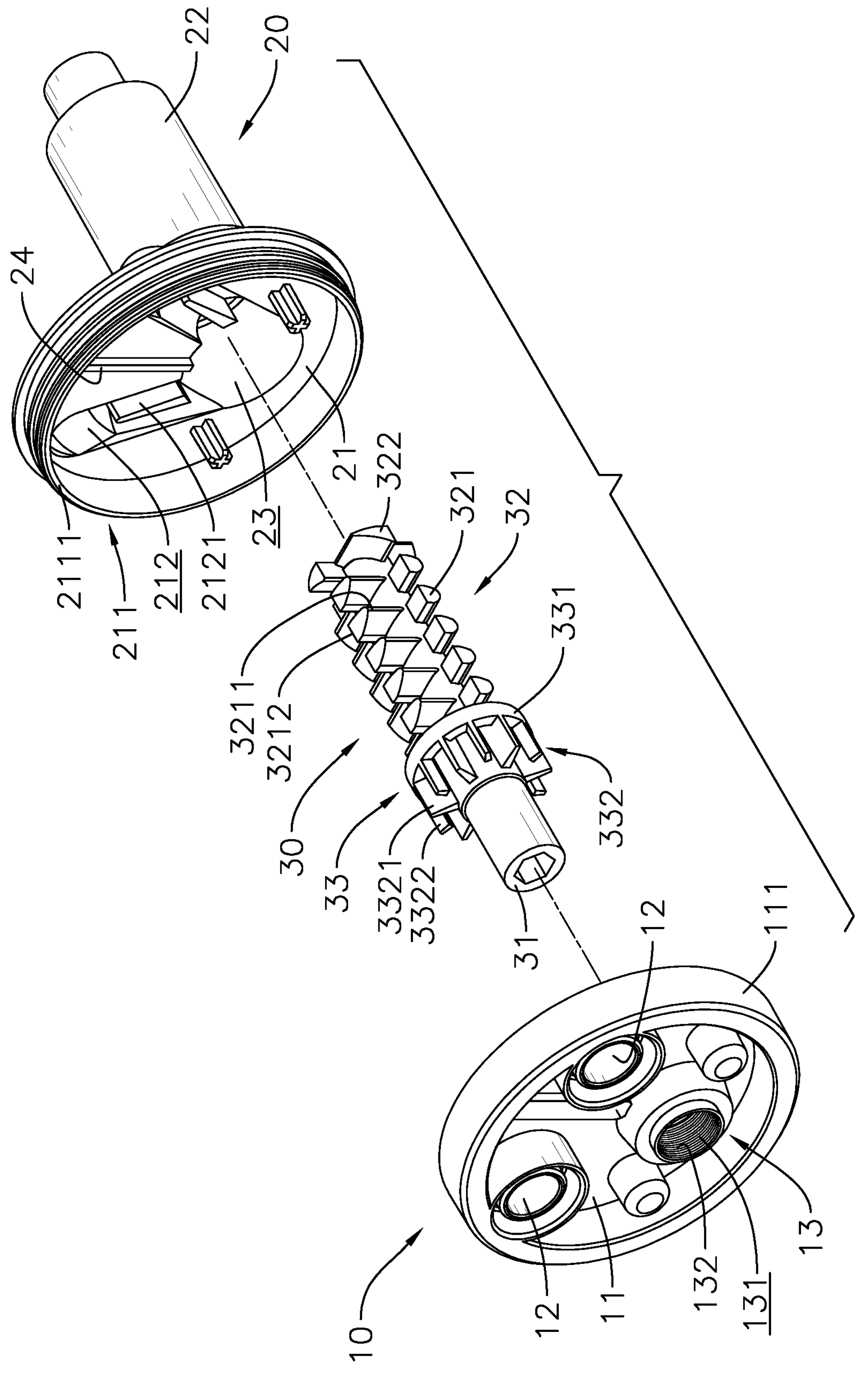
FIG. 2 is an exploded view of the dynamic mixer head with the sealing portion in FIG. 1.
Figure 3:
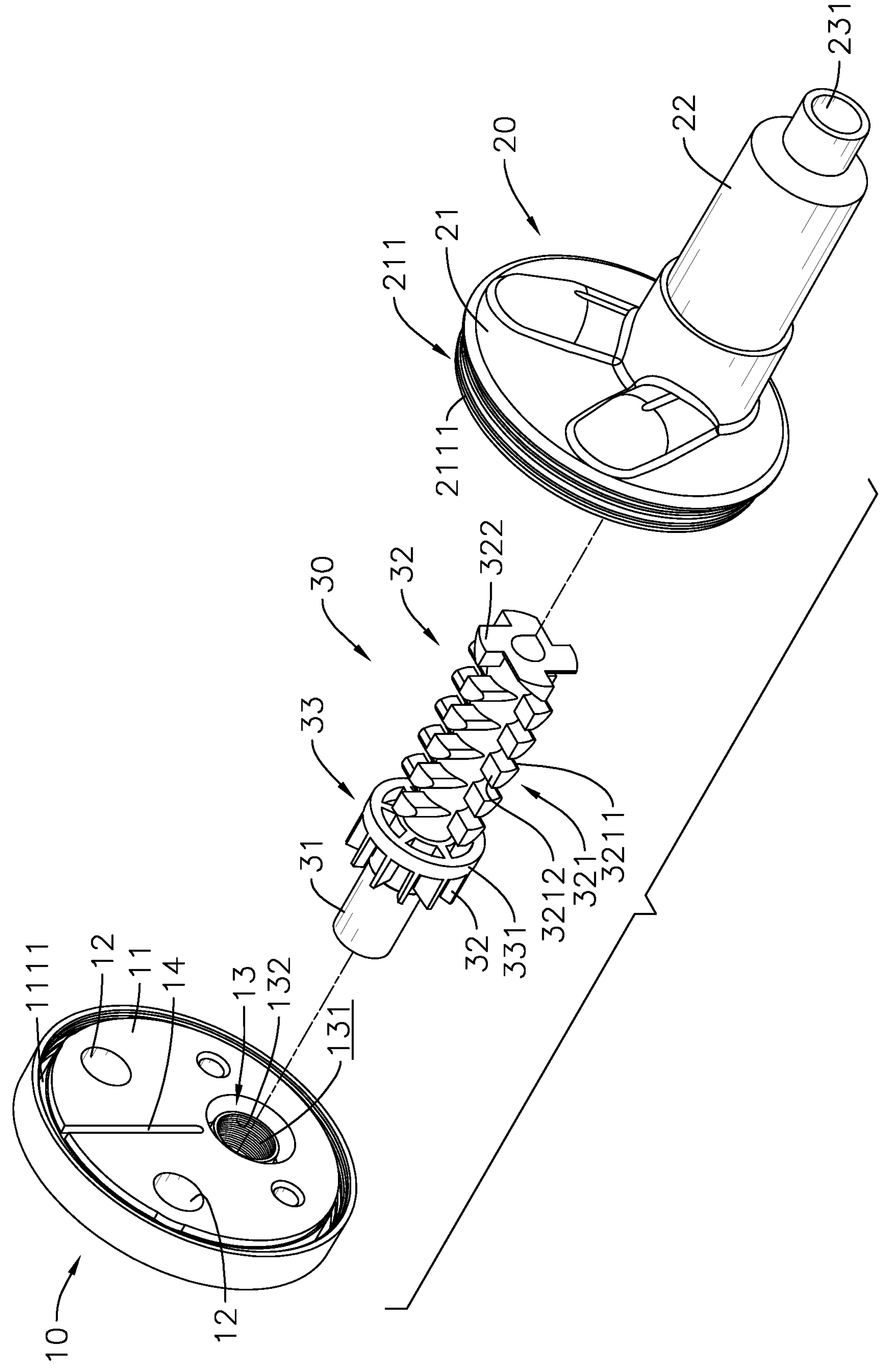
FIG. 3 is an exploded view of the dynamic mixer head with the sealing portion in FIG. 1, shown in another view angle.
Figure 4:
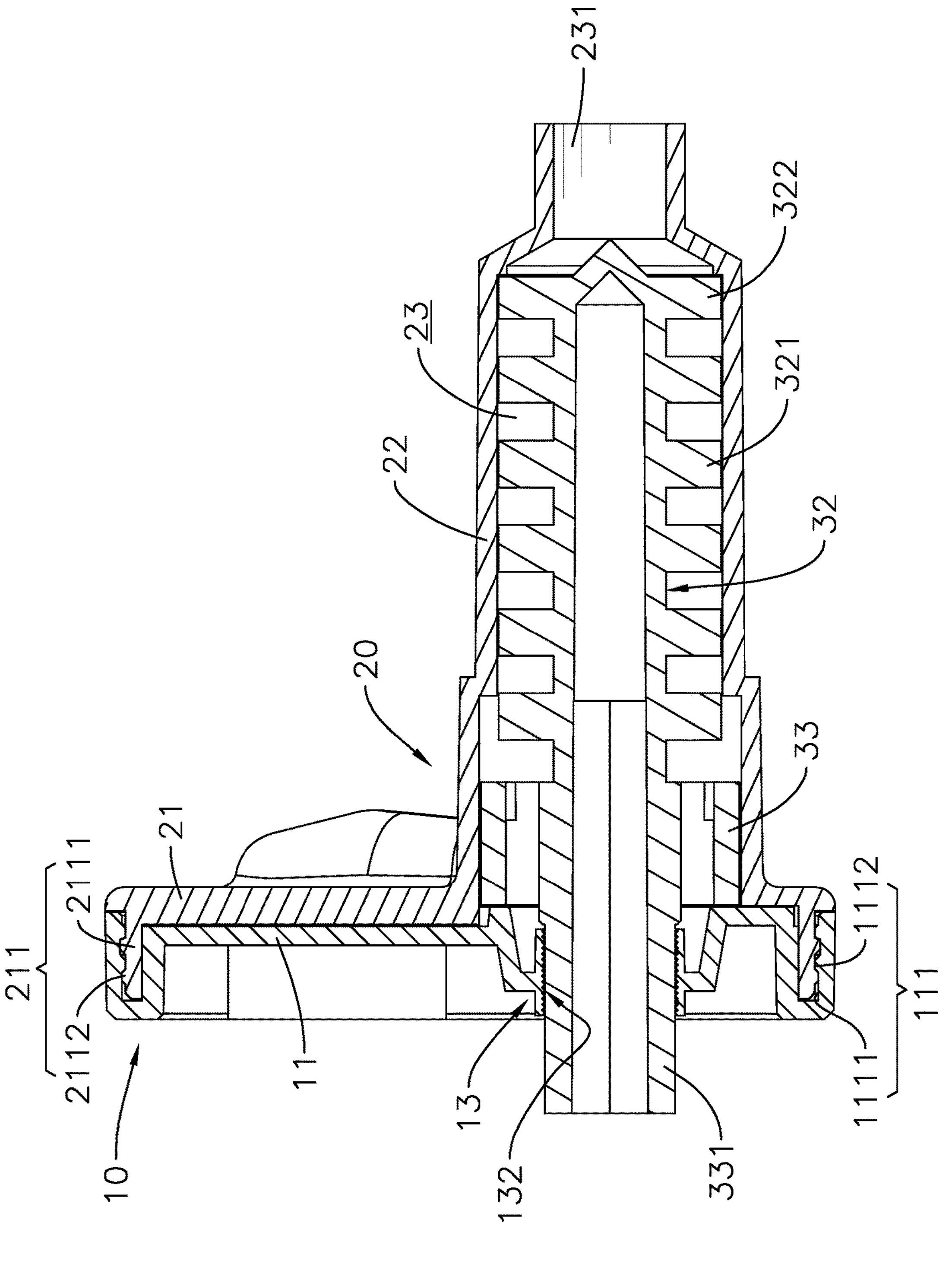
FIG. 4 is a cross-sectional side view of the dynamic mixer head with the sealing portion in FIG. 1.

With reference to FIGS. 1 to 4, a dynamic mixer head with a sealing portion in accordance with the present invention comprises a cover 10, a housing 20, and a rotor 30. The cover 10 is mounted to the housing 20, and the rotor 30 is rotatably disposed in the housing 20 and through the cover 10.

The cover 10 has a first base board 11, two inlets 12, a holding cylinder 13, and a linear groove 14.

The first base board 11 has a first engaging portion 111, and the first engaging portion 111 is formed on a border of the first base board 11. To be more precise, in this embodiment, the first engaging portion 111 includes an annular groove 1111 formed on a rim part of the first base board 11, and the annular groove 1111 is recessed from a surface of the first base board 11 which faces to the housing 20. The first engaging portion 111 may further have a first protrusion 1112 protruding from a side wall surface of the annular groove 1111.

The two inlets 12 are formed through the first base board 11 and spaced apart from each other.

Figure 6:
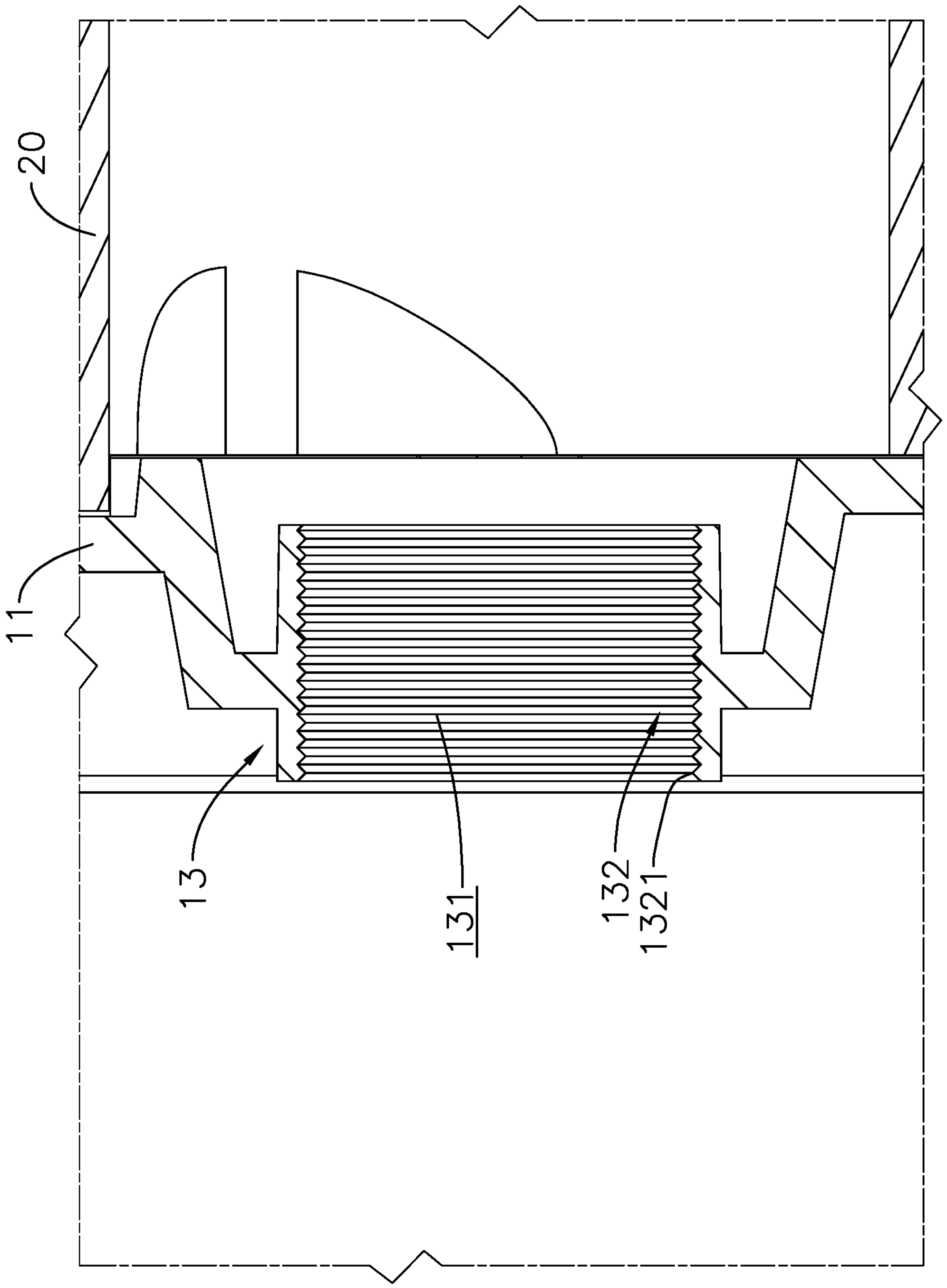
FIG. 6 is a partial enlarged cross-sectional side view of the dynamic mixer head with the sealing portion in FIG. 1, showing a sealing portion of the rotor holding cylinder.

With reference to FIG. 6 together, the holding cylinder 13 is formed on the first base board 11, and an axial direction of the holding cylinder 13 is parallel to a thickness direction of the first base board 11, and two ends of the holding cylinder 13 respectively protrude from two opposite surfaces of the first base board 11. In other words, in this embodiment, the holding cylinder 13 is formed through the first base board 11, but it is not limited thereto, and the holding cylinder 13 may not protrude from both the surfaces of the first base board 11.

The holding cylinder 13 has a rotor holding channel 131 and a sealing portion 132. The rotor holding channel 131 is formed in the holding cylinder 13 and spatially communicates with two ends of the holding cylinder 13. The scaling portion 132 protrudes from an inner wall surface of the rotor holding channel 131. To be more precise, the sealing portion 132 includes multiple annular ribs 1321. The annular ribs 1321 are disposed along an extending direction of the rotor holding channel 131 and spaced apart from each other, and each one of the annular ribs 1321 surrounds the rotor holding channel 131.

The linear groove 14 is recessed from the surface of the first base board 11, and said surface faces to the housing 20.

The housing 20 has a second base board 21, a mixing cylinder 22, an inner channel 23, and a linear rib 24.

The second base board 21 engages with the first base board 11, and the second base board 21 has a second engaging portion 211 and two grooves 212. The second engaging portion 211 is formed on a border of the second base board 21. In this embodiment, the second engaging portion 211 includes an annular wall 2111, and the annular wall 2111 is inserted into the annular groove 1111 of the first engaging portion 111.

The second engaging portion 211 may further have a second protrusion 2112 connected to the annular wall 2111, and the second protrusion 2112 is capable of abutting the first protrusion 1112 of the first engaging portion 111, thereby the first engaging portion 111 and the second engaging portion 211 engaging with each other.

The two grooves 212 are recessed from a surface of the second base board 21 facing to the first base board 11, and each one of the two grooves 212 fluidly communicates with a respective one of the two inlets 12 of the cover 10. In this embodiment, the two grooves 212 are connected to each other, thus forming a V-shaped configuration, but it is not limited thereto. In this embodiment, each one of the two grooves 212 has a spacer 2121. The spacer 2121 is mounted on an inner wall of the groove 212, and extends along the groove 212. The spacer 2121 is capable of enhancing the mixing effect.

The mixing cylinder 22 is connected to another surface of the second base board 21, and said surface faces away from the first base board 11. The mixing cylinder 22 has an outlet 231, and the outlet 231 is formed on an end surface which faces away from the second base board 21. The inner channel 23 is formed along an axial direction of the mixing cylinder 22, and is through the mixing cylinder 22 and the second base board 21. Besides, a diameter of the outlet 231 is smaller than a diameter of the inner channel 23.

The inner channel 23 fluidly communicates with the outlet 231, the two grooves 212, and the rotor holding channel 131. To be more precise, in this embodiment, the mixing cylinder 22 is connected to a corner of said V-shaped configuration of the two grooves 212, and thereby the two grooves 212 and the inner channel 23 fluidly communicate with each other, such that the two inlets 12 of the cover 10 fluidly communicate with the outlet 231. Furthermore, the inner channel 23 is concentric with the rotor holding channel 131 to fit the rotor 30, but it is not limited thereto.

The linear rib 24 protrudes from the surface of the second base board 21, and said surface faces to the first base board 11, and the linear rib 24 is disposed in the linear groove 14. To be more precise, the linear rib 24 is disposed between the two grooves 212, and extends from the inner channel 23 to the border of the second base board 21; a length and a location on the first base board 11 of the linear groove 14 correspond to those of the linear rib 24. Therefore, when the cover 10 and the housing 20 are engaging with each other, the linear rib 24 is in the linear groove 14 to divide a space between the first base board 11 and the second base board 21.

With reference to FIGS. 1 to 5, the rotor 30 is rotatably disposed in the inner channel 23 and through the cover 10, and the rotor 30 has a rotor axle 31, a mixing rod 32, and a mixing unit 33.

Figure 5:
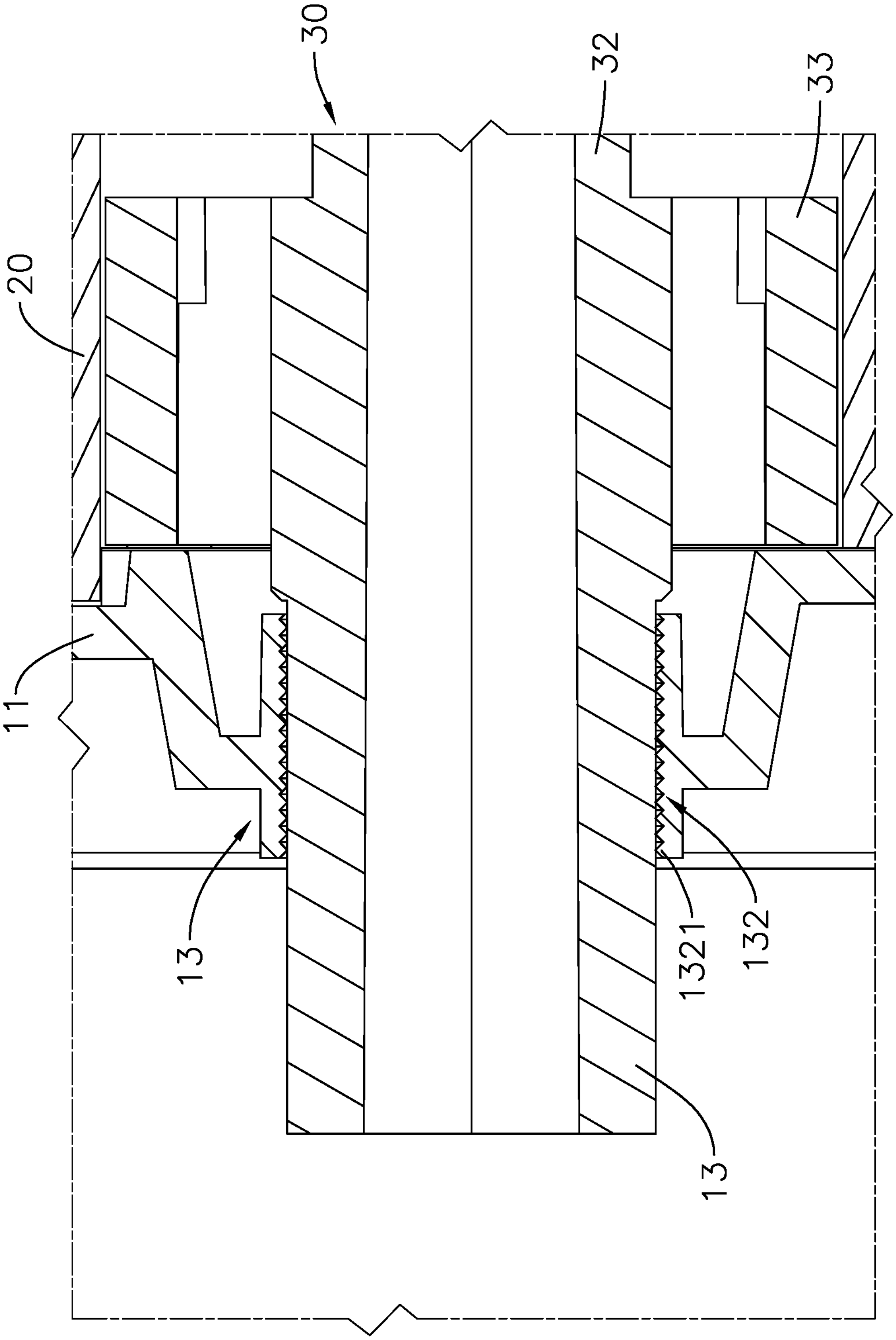
FIG. 5 is a partial enlarged cross-sectional side view of the dynamic mixer head with the sealing portion in FIG. 1, showing a rotor axle disposed in a rotor holding cylinder.

The rotor axle 31 is disposed through the rotor holding channel 131 and protrudes from the housing 20 and the cover 10 for connecting with an external driver. A peripheral surface of the rotor axle 31 contacts the sealing portion 132, and is surrounded by the sealing portion 132. To be more precise, as shown in FIG. 5, each one of the annular ribs 1321 surrounds and contacts the peripheral surface of the rotor axle 31, thereby preventing leakage of the components through the rotor holding channel 131.

The mixing rod 32 is connected to the rotor axle 31 and disposed in the inner channel 23; in this embodiment, the mixing rod 32 and the rotor axle 31 are integrally formed, but it is not limited thereto. The mixing rod 32 has multiple first vanes 321 and multiple second vanes 322.

The first vanes 321 protrude from a peripheral surface of the mixing rod 32; to be more precise, each one of the first vanes 321 protrudes from the peripheral surface of the mixing rod 32, and an end surface of the first vane 321 slidably contacts an inner wall surface of the inner channel 23. In this embodiment, the mixing rod 32 may be divided into several segments, and in each one of the segments, some of the first vanes 321 are formed along a peripheral direction of the segment and spaced apart from each other.

Each one of the first vanes 321 has a ridged side 3211 and a planar side 3212, which are located opposite to each other along a peripheral direction of the mixing rod 32, and the ridged sides 3211 of the first vanes 321 are oriented toward a same direction (i.e. same side along the peripheral direction of the mixing rod 32).

The second vanes 322 are connected to the peripheral surface of the mixing rod 32 and located adjacent to an end, which is oriented toward the outlet 231, of the mixing rod 32. Each one of the second vanes 322 has a ridged side oriented opposite to the ridged side 3211 of each one of the first vanes 321. To be more precise, the second vanes 322, which are formed on the end of the mixing rod 32, are similar to the first vanes 321, and a difference between the second vanes 322 and the first vanes 321 is orienting directions of the ridged sides, which are opposite to each other.

The mixing unit 33 is connected to the mixing rod 32 and located adjacent to the rotor axle 31. The mixing unit 33 has a connecting ring 331 and multiple fins 332. The connecting ring 331 surrounds and is spaced apart from the mixing rod 32; the fins 332 are connected to a surface of the connecting ring 331, and said surface faces to the first base board 11 therein. The fins 332 are spaced apart from each other, and each one of the fins 332 extends toward the first base board 11 of the cover 10.

The multiple fins 332 may further include at least one first fin 3321 and at least one second fin 3322, the first fin 3321 is connected to the mixing rod 32 while the second fin 3322 is not. To be more precise, the mixing unit 33 is connected to the mixing rod 32 via the first fin 3321, the first fin 3321 and the second fin 3322 are configured to stir the components, and the components are capable of moving through a space between the connecting ring 331 and the mixing rod 32. In this embodiment, the mixing unit 33 has six first fins 3321 and six second fins 3322 disposed alternately along the peripheral direction of the mixing rod 32.

When the dynamic mixer head with the sealing portion is in operation, the components respectively enter the grooves 212 via the inlets 12. Each one of the components is separated into two strands by the spacer 2121 when moving along the groove 212, thereby enhancing the mixing effect of the components around the mixing unit 33. The mixture of the components then moves into the inner channel 23, because the annular ribs 1321 of the sealing portion 132 form a multi-layer barrier in a space between the rotor axle 31 and the inner wall surface of the rotor holding channel 131, the mixture of the components would not leak through the rotor holding channel 131 and keeps being pushed to move toward the outlet 231. As the mixture of the components moves along the inner channel 23, the rotor 30 rotates such that the mixing unit 33 and the first vanes 321 stir the mixture of the components, and the second vanes 322 are capable of pressing the mixture of the components due to being disposed in an opposite direction to the first vanes 321; furthermore, the diameter of the outlet 231 being smaller than the diameter of the inner channel 23 also enhances the mixing effect via pressing the mixture of the components.

Figure 7:
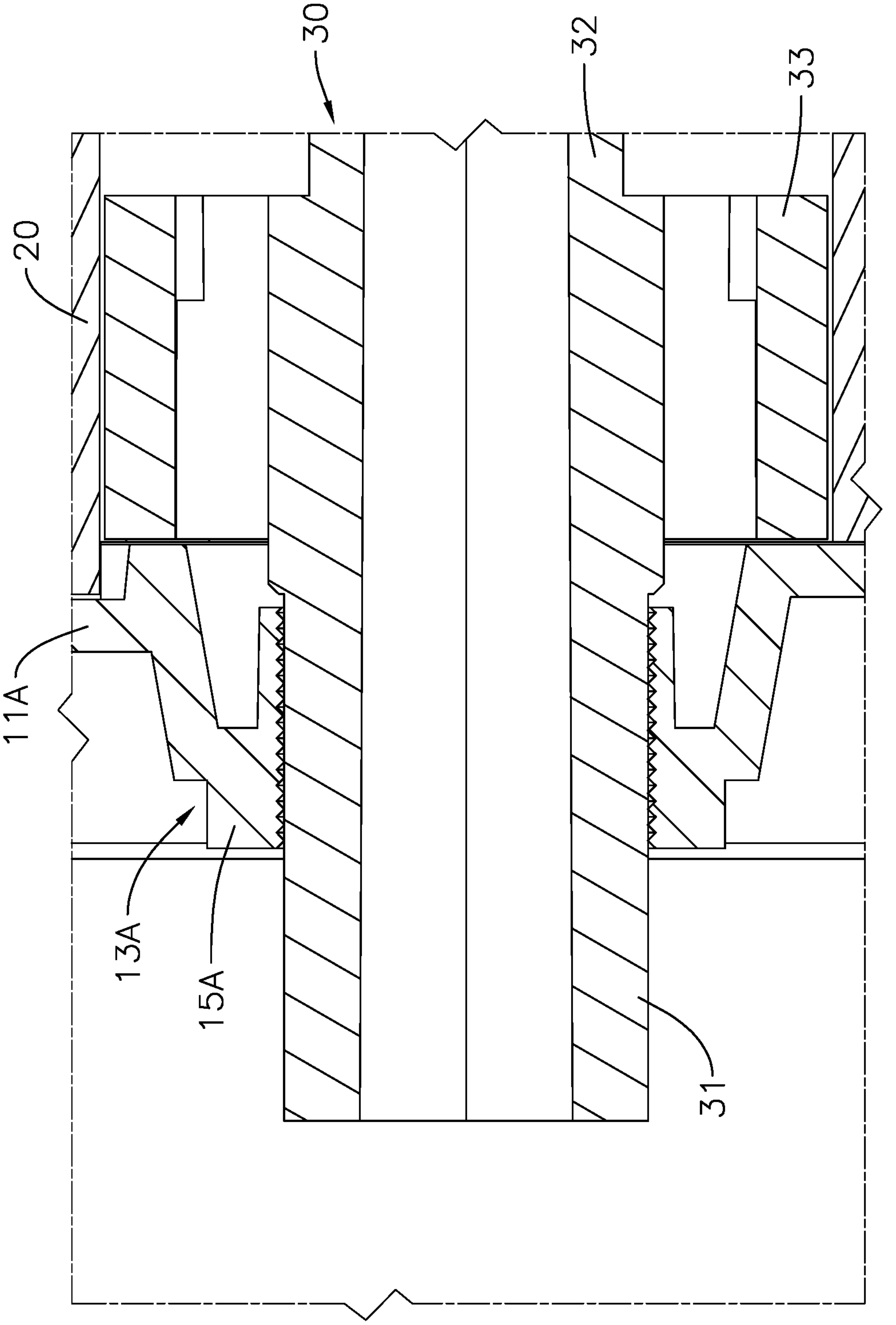
FIG. 7 is a perspective view of an alternative embodiment of the dynamic mixer head with the sealing portion in accordance with the present invention.

Next, with reference to FIG. 7, an alternative embodiment of the dynamic mixer head with the sealing portion is similar to the aforementioned embodiment, and a difference of the alternative embodiment is having a resisting ring 15A.

The resisting ring 15A surrounds a section of the holding cylinder 13A which protrudes from the surface of the first base board 11A, and said surface of the first base board 11A faces away from the housing 20. The resisting ring 15A is connected to said surface of the first base board 11A and said section of the holding cylinder 13A, and thereby a structural strength of the holding cylinder 13A is enhanced to prevent the holding cylinder 13A from being bent and to increase a pressure that the holding cylinder 13A exerts to the rotor axle 31. In this embodiment, the resisting ring 15A is integrally formed with said surface of the first base and said section of the holding cylinder 13A, but it is not limited thereto.

To sum up, with the multi-layer barrier formed by the annular ribs 1321 of the sealing portion 132, the dynamic mixer head with the sealing portion in this disclosure does not need tight fitting of the rotor 30 and the holding cylinder 13, and thus the rotor 30 in this disclosure would not be that difficult to rotate as the prior art; besides, unlike the prior art, the dynamic mixer head with the sealing portion in this disclosure only needs one sealing portion 132, thus being easy to manufacture.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dynamic mixer head comprising:
a cover having:
a first base board having:
a first engaging portion formed on a border of the first base board;
two inlets formed through the first base board and spaced apart from each other; and
a holding cylinder formed on the first base board; the holding cylinder having:
a rotor holding channel formed in the holding cylinder and spatially communicating with two ends of the holding cylinder; and
a sealing portion protruding from an inner wall surface of the rotor holding channel;
a housing mounted on the cover and having:
a second base board engaged with the first base board and having:
a second engaging portion formed on a border of the second base board and engaging with the first engaging portion;
two grooves recessed from a surface of the second base board, said surface of the second base board facing to the first base board, and each one of the two grooves fluidly communicating with a respective one of the two inlets of the cover;
a mixing cylinder connected to another surface of the second base board, said another surface being away from the first base board; the mixing cylinder having:
an outlet formed on an end surface away from the second base board;
an inner channel formed in the mixing cylinder, and being through the mixing cylinder and the second base board; the inner channel fluidly communicating with the outlet, the two grooves, and the rotor holding channel; and
a rotor rotatably disposed in the inner channel and through the cover, the rotor having:
a rotor axle disposed through the rotor holding channel, and a peripheral surface of the rotor axle contacting and surrounded by the sealing portion; and
a mixing rod connected to the rotor axle and disposed in the inner channel, and the mixing rod having:
multiple first vanes protruding from a peripheral surface of the mixing rod; and
wherein the sealing portion includes:
multiple annular ribs disposed along an extending direction of the rotor holding channel and spaced apart from each other, and each one of the annular ribs surrounding and contacting the peripheral surface of the rotor axle.

2. The dynamic mixer head as claimed in claim 1, wherein the two ends of the holding cylinder respectively protrude from two opposite surfaces of the first base board.

3. The dynamic mixer head as claimed in claim 2, wherein the cover has:

a resisting ring surrounding a section of the holding cylinder, said section protruding from one of the two opposite surfaces of the first base board, said surface facing away from the housing; the resisting ring connected to said surface of the first base and said section of the holding cylinder.

4. The dynamic mixer head as claimed in claim 3, wherein:

the resisting ring is integrally formed with said surface of the first base board and said section of the holding cylinder.

5. The dynamic mixer head as claimed in claim 4, wherein:

the cover has:

a linear groove recessed from one of the two opposite surfaces of the first base board, said surface facing the second base board; and the housing has:

a linear rib protruding from the surface of the second base board, said surface facing the first base board, and the linear rib disposed in the linear groove.

6. The dynamic mixer head as claimed in claim 5, wherein each one of the two grooves of the housing has:

a spacer mounted on an inner wall of the groove, and the spacer extending along the groove.

7. The dynamic mixer head as claimed in claim 6, wherein:

a diameter of the outlet is smaller than a diameter of the inner channel.

8. The dynamic mixer head as claimed in claim 7, wherein:

each one of the first vanes has:

a ridged side and a planar side located opposite to each other along a peripheral direction of the mixing rod; and the ridged sides of the first vanes are oriented toward a same direction.

9. The dynamic mixer head as claimed in claim 8, wherein the mixing rod has:

multiple second vanes connected to the peripheral surface of the mixing rod and located adjacent to an end of the mixing rod, said end oriented toward the outlet; each one of the second vanes having a ridged side oriented opposite to the ridged side of each one of the first vanes.

10. The dynamic mixer head as claimed in claim 9, wherein the rotor has:

a mixing unit connected to the mixing rod and located adjacent to the rotor axle, and the mixing unit having:

a connecting ring surrounding and spaced apart from the mixing rod; and multiple fins connected to the connecting ring and the fins spaced apart from each other, and each one of the fins extending toward the first base board of the cover.

11. The dynamic mixer head as claimed in claim 10, wherein at least one of the multiple fins is connected to the mixing rod.

12. The dynamic mixer head as claimed in claim 1, wherein:

the cover has:

a linear groove recessed from a surface of the first base board, said surface facing to the second base board; and the housing has:

a linear rib protruding from the surface of the second base board, said surface facing the first base board, and the linear rib disposed in the linear groove.

13. The dynamic mixer head as claimed in claim 1, wherein each one of the two grooves of the housing has:

a spacer mounted on an inner wall of the groove, and the spacer extending along the groove.

14. The dynamic mixer head as claimed in claim 1, wherein:

a diameter of the outlet is smaller than a diameter of the inner channel.

15. The dynamic mixer head as claimed in claim 1, wherein:

each one of the first vanes has:

a ridged side and a planar side located opposite to each other along a peripheral direction of the mixing rod; and the ridged sides of the first vanes are oriented toward a same direction.

16. The dynamic mixer head as claimed in claim 15, wherein the mixing rod has:

multiple second vanes connected to the peripheral surface of the mixing rod and located adjacent to an end of the mixing rod, said end oriented toward the outlet; each one of the second vanes having a ridged side oriented opposite to the ridged side of each one of the first vanes.

17. The dynamic mixer head as claimed in claim 1, wherein the rotor has:

a mixing unit connected to the mixing rod and located adjacent to the rotor axle, and the mixing unit having:

a connecting ring surrounding and spaced apart from the mixing rod; and multiple fins connected to the connecting ring and the fins spaced apart from each other, and each one of the fins extending toward the first base board of the cover.

18. The dynamic mixer head as claimed in claim 17, wherein at least one of the multiple fins is connected to the mixing rod.

* * * * *